United States Patent [19]
Engelhardt et al.

[11] Patent Number: 5,750,461
[45] Date of Patent: May 12, 1998

[54] IODINE ADSORPTION AGENT

[76] Inventors: Thomas Engelhardt, Alte Poststrasse 13, 85356 Freising; Reinhard Hähn, Birkenweg 12, 84186 Vilsheim, both of Germany

[21] Appl. No.: 509,186

[22] Filed: Jul. 31, 1995

[30] Foreign Application Priority Data

Aug. 20, 1994 [DE] Germany .......... 44 29 644.4

[51] Int. Cl.⁶ .................................................. B01J 23/50
[52] U.S. Cl. ............................................. 502/347; 502/400
[58] Field of Search ............................. 252/184; 95/90, 95/116, 141; 502/400, 407, 414, 347

[56] References Cited

U.S. PATENT DOCUMENTS

| | | |
|---|---|---|
| 3,838,554 | 10/1974 | Wilhelm et al. .......... 55/71 |
| 4,204,980 | 5/1980 | Pasha et al. . |
| 4,312,647 | 1/1982 | Funabashi et al. . |
| 4,369,048 | 1/1983 | Pence et al. . |
| 4,382,879 | 5/1983 | Funabashi et al. . |
| 4,461,711 | 7/1984 | Behrens et al. . |
| 4,913,850 | 4/1990 | Puppe et al. . |
| 5,075,084 | 12/1991 | Wilhelm et al. . |

FOREIGN PATENT DOCUMENTS

| | | |
|---|---|---|
| 3824606 | of 0000 | Germany . |
| 3901784 | of 0000 | Germany . |
| 4114400 | of 0000 | Germany . |
| 54133299 | of 0000 | Germany . |
| 63162040 | of 0000 | Germany . |

*Primary Examiner*—Anthony McFarlane
*Assistant Examiner*—Alexander G. Ghyka
*Attorney, Agent, or Firm*—Scott R. Cox

[57] ABSTRACT

An iodine adsorption agent is described, containing silver or a silver salt on a porous, temperature-resistant and acid-resistant organic carrier with an average pore diameter in the range from 6 to 200 nm. It has a pore diameter distribution in which 80% of the pore volume is contained in pores whose diameters lie within the range of ±50% about the average pore diameter.

10 Claims, 1 Drawing Sheet

IODINE ADSORPTION AGENT

BACKGROUND OF INVENTION

The invention concerns an iodine adsorption agent containing silver or a silver salt on a porous, temperature-resistant and acid-resistant inorganic carrier.

Both in nuclear power plants and in industrial nuclear processing plants, adsorption agents are required that are capable of irreversibly adsorbing gaseous radioactive iodine that is also present in the form of gaseous iodine compounds, such as methyl iodide. For example, in nuclear power plants, emergency retention filters are installed that are capable of adsorbing large quantities of radioactive iodine in the event of an industrial nuclear accident.

All nuclear power plants have been equipped with iodine monitors for monitoring purposes. The main component of these iodine monitors is filter cartridges that contain a suitable iodine adsorbent. As these iodine filters are used for industrial measurement purposes, high selectivity with respect to radioactive iodine is necessary.

In industrial nuclear processing plants, large quantities of radioactive iodine in elemental form or in organic form are liberated during the chemical dissolution of used fuel elements. For this application and in order to extend filter changing cycles, the iodine adsorption agents must be resistant to acids and to gases that contain water vapor. They should also have an iodine adsorption capacity that is as high as possible both for organic and for elemental iodine. They should be inorganic and should have a level of abraded dust that is as low as possible. They should also have an iodine retention capacity that is as high as possible (high decontamination factor DF) and as high a silver content as possible.

A process for the separation and collection of iodine from the aqueous phase, e.g. from radioactive water, is disclosed by DE-C-31 08 991 in which the iodine is adsorbed by active carbon, whereby the pH value is adjusted to <7. This material is not suitable for industrial nuclear plants.

A process and an arrangement for taking samples of, and the measurement of, radioactive gaseous iodine compounds is disclosed by DE-A-41 14 400, whereby use is made of a sorption material based on an $Al_2O_3$ carrier that has been impregnated with 25 to 50% of silver nitrate. No data is disclosed concerning the pore structure of the sorption material.

A process and an agent for the removal of radioactive iodine and radioactive organic iodine compounds from gases is disclosed by DE-A-26 45 552, whereby use is made of a ceramic sorption material that has been impregnated with a mixture comprising a metal salt and a water soluble secondary amine. Silicon dioxide or aluminum oxide with a specific surface area of approximately 5 to 250 $m^2/g$ can be used as the sorption material. No data concerning the pore structure of the sorption material is disclosed. In addition, the material is not thermally stable because of the secondary amine that is contained therein.

An iodine adsorption agent for the removal of radioactive iodine that is present in waste gases derived from nuclear power plants with a high moisture level is disclosed by DE-C-29 32 821. The iodine adsorption agent comprises a carrier and a film, that is applied to the carrier surface. The agent comprises an iodine adsorbing organic material that exhibits a higher ability to dissolve iodine than water and possesses a low gas pressure. It forms a separate phase relative to water and is not compatible with or miscible with water. The organic material preferentially adsorbs organically bound iodine other than elemental iodine. In addition, the material is not thermally stable. Further, no data is disclosed concerning the pore structure of the carrier.

JP-A-63 16 20 40 (Derwent Abstracts, Ref. 88-230336/33) describes an adsorption agent for the removal of radioactive iodine based on aluminum oxide with a specific surface area of more than 20 $m^2/g$ that has been impregnated with Ag or $AgNO_3$. The carrier contains micro-pores of less than 20 nm. There is no disclosure of pore distribution.

Silver-containing adsorption agents for radioactive iodine are disclosed by JP-A-54 13 32 99 (Derwent Abstracts, Ref. 85-1988/47). The carrier consists of amorphous or crystalline aluminum oxide with an average pore diameter of approximately 20 to 200 nm and a pore volume of 0.1 $cm^3/g$. There is no disclosure concerning pore distribution.

Processes for the removal of iodine and iodine compounds from gases and vapors are disclosed by DE-A-38 08 742 (equivalent to EP-B 0 332 964), DE-A-39 01 784, DE-A-39 03 445 (equivalent to EP-A-0 379 895) and DE-A-38 24 606, whereby granular molecular sieve materials of the Faujasite type of structure that have been exchanged using silver or silver and lead are used as adsorption agents. Because of the high specific surface areas of the molecular sieves that are used (>300 $m^2$), such iodine adsorption agents are not suitable as iodine monitors as other gaseous radioactive substances are also adsorbed onto them. In addition, the molecular sieves that are used are not stable under the operating conditions of a processing plant because of their high sensitivity to acids.

A similar process is disclosed by U.S. Pat. No. 4,369,048 whereby a zeolite of the mordenite type, that has been exchanged using silver, is used as the adsorption agent. The agent also adsorbs radioactive xenon in addition to radioactive iodine compounds. The pore size of the mordenite is <1.2 nm.

U.S. Pat. No. 3,838,554 describes a process for the removal of iodine and/or low molecular weight organic iodine compounds in which use is made of adsorption agents based on meta-kaolin/silicic acid in the form of spheres and granular materials with a pore volume of 50 to 80% and a BET specific surface area of 70 to 250 $m^2/g$, that have been loaded with silver salts. At least 10% of the pore volume is allotted to pore diameters of <10 nm and at least 5% of the pore volume should be allotted to pore diameters of <100 nm. A silver salt content of 4 to 18% by weight is indicated. The adsorption agent is usually prepared by impregnation with 7 to 10% by weight silver nitrate. In the case of higher silver nitrate contents, efflorescence occurs during preparation which results in very disruptive rubbing of silver nitrate. In addition, adsorption agents that contain silver nitrate are resistant to water vapor only to a limited extent. This can lead to problems in industrial nuclear processing plants.

EP-P-0 034 037 describes an adsorption agent for iodine and/or organic iodine compounds with a porous carrier that has been impregnated with a substance that reacts readily with iodine and/or organic iodine compounds. The carrier is formed from particles that adhere to one another. The particles have pores with an average pore diameter of 4 to 20 nm although pores with an average diameter of 100 to 200 nm can be found between the particles. The carrier therefore contains a bimodal pore structure. The porous carrier consists of aluminum oxide, silica gel, active carbon or a synthetic plastic material. This iodine adsorption agent allegedly excels by virtue of its especially good retention of iodine in atmospheres that contain water vapor. It is, however, conceded that the iodine retention capacity is higher in the nitrate-impregnated form than in the metal form.

The object of the invention is to disclose an iodine adsorption agent comprising inorganic materials that can have larger quantities of silver salts or elemental silver deposited thereon without the rubbing off of silver which has been observed during use. Such rubbing off leads to considerable problems in processing plants as radioactive iodine is bound to this silver.

It has now been surprisingly found that the rubbing off of silver can be considerably reduced if the adsorption agent has a very narrow pore diameter distribution.

SUMMARY OF INVENTION

The subject of the invention is thus an iodine adsorption agent, containing silver or a silver salt on a porous, temperature-resistant and acid-resistant inorganic carrier, that is characterized in that (1) it has an average pore diameter in the range from about 6 to 200 nm and (2) it has a pore diameter distribution in which 80% of the pore volume is contained in pores whose diameters lie within the range of ±50% or, preferably, ±40% of the average pore diameter.

DESCRIPTION OF INVENTION

Figure 1:
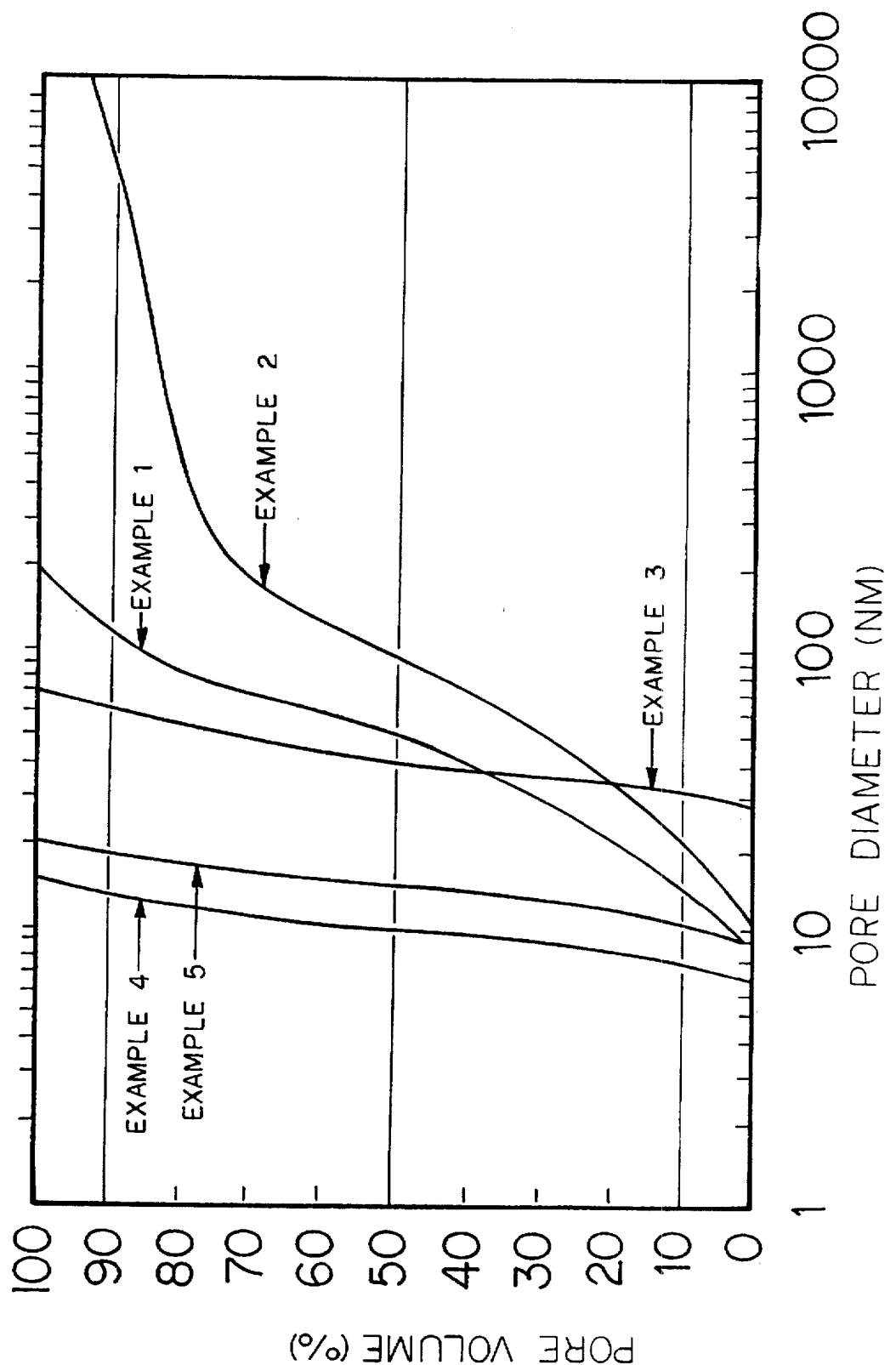
FIG. 1 is a diagram showing the pore volume (in %) plotted against the pore diameter for Examples 1–5.

The average pore diameter d50 (50% of the pore volume) and the pore diameters d10 and d90 (10 or 90%, respectively, of the pore volume=80% of the pore volume) are determined using the mercury penetration method in accordance with ASTM D4284-83. In this procedure, liquid mercury at room temperature is compressed into the pore system of the sample that is to be investigated. The porosimeter measures the quantity of mercury that has been pressed in as a function of the pressure that is required for this purpose. Because of the negative wetting angle between mercury and the sample surface, the pressure has to be increased more and more with decreasingly small pores. In the case of the measurement apparatus that is used (Micomeretics Pore Sizer 9310), the pressure range is 1 to 3000 bar for pores down to 6 nm.

From the relationship of the penetrated mercury to the pressure that is required for this penetration, one calculates the pore size distribution in the form which is illustrated in the appended diagram.

The percentage deviation from the average pore diameter results from the following relationship:

$$D(\%) = \frac{d90 - d10}{2d50} \times 100$$

The iodine adsorption agent in accordance with the invention can be used with good results for iodine monitors in nuclear power plants and for industrial iodine filters in industrial nuclear processing plants without the feared rubbing off of silver occurring as is the case with known iodine adsorption agents. In addition, iodine adsorption agents with a narrow pore diameter distribution in accordance with the invention permit the degree of separation of radioactive iodine to be increased relative to conventional adsorption agents.

It has been found in practical investigations that it is not the average pore diameter but the pore diameter distribution that is essential. In the pore diameter range between 6 and 200 nm or, preferably, between 6 and 100 nm, one can find suitable carriers that exhibit the characteristic features of the invention.

The pore diameter distributions of known iodine adsorption agents, e.g. in accordance with U.S. Pat. No. 3,838,554 and EP-B-0 034 037 are, in contrast, significantly broader than those of the adsorption agents in accordance with the invention.

The iodine adsorption agent in accordance with the invention preferably has a pore volume of more than approximately 0.15 cm³/g.

The reason for the reduction in the rubbing off of silver that can be achieved via the invention is not well understood. One assumes that this effect may be that capillary condensation of evaporated water takes place in the smaller pores that have been impregnated with the silver salt solution during the drying of the adsorption agent, whereas this is not the case with the larger pores. As a result, a moisture gradient is probably produced within the adsorption agent which brings about migration of the silver salt to the surface, so that secondary silver salt crystals grow out of the carrier which can easily be abraded in the form of a fine dust. In the case of the adsorption agents in accordance with the invention, by contrast, no moisture gradient arises because of the narrow pore diameter distribution. However, the applicants are not restricted to this theory.

It is especially advantageous to prepare the iodine adsorption agents in accordance with the invention in reduced form. For this purpose, the carriers in accordance with the invention are first impregnated with a soluble silver salt, such as silver nitrate, after which the impregnated carriers are dried and the silver salt is reduced to elemental silver in a hydrogen atmosphere. As a result of this procedure, the degree of separation of iodine can be increased and the proportion of dust can be further reduced.

The specific surface area of the iodine adsorption agent in accordance with the invention preferably amounts to approximately 30 to 150 m²/g. The specific surface area is determined in accordance with the BET method (a single point method using nitrogen in accordance with DIN 66 132), whereby the sample is heated to approximately 250° C. beforehand.

The iodine adsorption agent in accordance with the invention preferably contains 2 to 40 or, preferably, 5 to 30% by weight of Ag.

The carrier for the iodine adsorption agent in accordance with the invention is preferably selected from $Al_2O_3$, $SiO_2$, $TiO_2$, $ZrO_2$, amorphous aluminum silicate (e.g. mixtures or decomposition products comprising $SiO_2$ and $Al_2O_3$) or mixtures thereof.

Other oxide-type carrier materials are also suitable that can be prepared in the form of microporous carriers with the claimed pore diameter distribution. The carriers are preferably present in the form of spheres or granules. Molecular sieves based on zeolite are not used as carriers for the reasons that were previously discussed.

The iodine adsorption agent in accordance with the invention is preferably present in the form of molded objects with "dimensions" of approximately 0.1 to 5 mm or, more preferably, approximately 0.5 to 3 mm. Use can be made of spheres, tablets, extruded materials, etc. as the molded objects.

With spherical carriers, the "dimensions" correspond to the diameter. With irregularly shaped bodies, the "dimension" corresponds to the largest cross-sectional dimension. With tablets, the "dimensions" correspond to the diameter, the height being generally somewhat less than the diameter (30–70%). With extruded bodies, the "dimensions" refer to the length of the body, the diameters being generally less (30–70%) of the length.

The invention is disclosed by means of the examples disclosed below.

EXAMPLE 1 (comparison)

A catalyst carrier was prepared in the form of spheres comprising meta-kaolin and silica sol in accordance with Example 6 of U.S. Pat. No. 3,838,554. This carrier was dried for 2 hours at 110° C. and then it is impregnated several times with an aqueous silver nitrate solution. The carrier had the silver nitrate solution completely poured over it in a suitable vessel and then the vessel was evacuated three times. The impregnated carrier spheres were then taken out of the solution and allowed to drip off onto a sieve. The physically adhering silver nitrate solution was then blown off with an air blower and the carrier particles which were still moist, were dried for 5 hours at 95° C. The concentration of the silver nitrate solution was selected in such a way that sufficient silver nitrate remained behind such that the carrier contained 25% silver (calculated as elemental silver).

The appended diagram (FIG. 1) shows the pore volume (in %) plotted against the pore diameter. From the curve in each case, the average pore diameter d50 (at 50% of the pore volume) and the pore diameters at 10 and 90% of the pore volume (d10 and d90) were determined. These were indicated in Table I together with the other physical properties. The pore volume was the maximum pore volume under an intrusion pressure of 3000 bar.

EXAMPLE 2 (comparison)

An iodine adsorption agent on an $Al_2O_3$ carrier with a grain size of 1 to 2 mm was prepared in accordance with the method indicated in EP-B-0 034 037 (page 4, lines 38 through 65). The carrier was impregnated with a silver nitrate solution, whereby the concentration of the solution was selected such that the finished product contained a quantity of silver nitrate that corresponded to 25% by weight of elemental silver. The fraction between 1 and 2 mm was sieved out for the adsorption experiments described in Example 6.

The values for d50, d10 and d90 are found from the diagram and are indicated in Table I together with the other physical properties.

EXAMPLE 3 (invention)

A $SiO_2$ carrier in the form of spheres with diameters in the range from 1 to 2 mm (a commercial product from the Fuji Davison firm) was impregnated with silver nitrate solution and dried in accordance with the method of Example 1. The concentration of the silver nitrate solution was selected in such a way that the finished iodine adsorption agent had a silver content of 25% by weight (calculated as elemental silver).

The values for d50, d10 and d90 are found from the diagram and are indicated in Table I together with the other physical properties.

EXAMPLE 4 (invention)

An $Al_2O_3$ carrier in the form of spheres (a commercial product from the Condea firm) with diameters in the range from 1 to 2 mm was impregnated with silver nitrate solution in accordance with the method of Example 1, whereby the quantity and concentration of the silver nitrate solution was selected in such a way that the silver content (calculated as elemental silver) amounts to 25% by weight.

The values for d50, d10 and d90 are found from the diagram and are indicated in Table I together with the other physical properties.

EXAMPLE 5 (invention)

In order to decompose the silver nitrate to silver oxide, the carrier that was prepared and impregnated with silver nitrate in accordance with Example 4, was heated in an oven over a period of 10 hours from 20° C. to 250° C. The silver oxide was then reduced to silver on the carrier using hydrogen at 250° C.

The values for d50, d10 and d90 are found from the diagram and are indicated in Table I together with other physical properties. Relative to Example 4, an enlargement in the pore volumes and the pore diameters is shown as the reduced silver claimed less space than the silver nitrate.

EXAMPLE 6 (adsorption experiments)

The iodine adsorption agents prepared in accordance with Examples 1 through 5 were introduced into test tubes with a length of 200 mm and a diameter of 25 mm. Individual segments, that are 25 mm long, are separated by means of fine steel filter inserts of 25 mm diameter. In total, 7 segments were located in each test tube. The test tubes were closed at both ends by means of stainless steel wool.

The test tubes that were prepared in this way were incorporated into part of the flow through a waste gas line from a dissolution kettle for radioactive fuel elements. During the dissolution of the fuel elements, these test tubes were impacted with waste air under the following conditions, whereby the waste air contained radioactive iodine in elemental and organic form (as methyl iodide):

Temperature: 140° C.

Flow rate: 510 liters/hour

Iodine activity: Iodine 129, $10^4$ to $10^6$ Bq/$m^3$

Test time: 25 days

After the test time, the test tubes were dismantled and the degree of deposition or adsorption was determined for iodine 129 after 10 cm, i.e. after 4 segments. The level of abrasion is determined using the remaining three segments, that had not been contaminated radioactively, by placing the adsorbents on a sieve with an internal mesh width of 0.6 mm and separating the dust fraction (principally silver nitrate dust or, as the case may be, silver dust). The proportion of dust was determined gravimetrically.

The degree of deposition (or adsorption) for iodine and the proportion of dust in the samples in accordance with Examples 1 through 5 is indicated in Table II:

TABLE I

| Example | 1 | 2 | 3 | 4 | 5 |
| --- | --- | --- | --- | --- | --- |
| Form | sphere | granular material | sphere | sphere | sphere |
| BET surface area * ($m^2$/g) | 65 | 18 | 84 | 44 | 127 |
| Pore volume (ml/g) | 0.35 | 0.45 | 0.49 | 0.31 | 0.51 |
| d50 (nm) | 50 | 90 | 40 | 10 | 12 |

TABLE I-continued

| Example | 1 | 2 | 3 | 4 | 5 |
|---|---|---|---|---|---|
| d90 (nm) | 100 | 2000 | 55 | 13 | 18 |
| d10 (nm) | 10 | 25 | 30 | 8 | 10 |
| ** D (%) | 90 | 1100 | 31.3 | 25 | 33 |

\* in accordance with DIN 66132
\*\* (percentage deviation from average pore diameter)

TABLE II

| Example | 1 | 2 | 3 | 4 | 5 |
|---|---|---|---|---|---|
| Degree of I-deposition (or adsorption) | 99.35 | 99.10 | 99.90 | 99.90 | 99.99 |
| Proportion of dust | 7.2 | 8.5 | 2.7 | 2.2 | 0.9 |

We claim:

1. An iodine adsorption agent comprising silver or a silver salt on a porous, temperature-resistant and acid-resistant inorganic carrier, wherein the carrier has an average pore diameter, d50, in the range from about 6 to 200 nm, and a pore diameter distribution in which about 80% of the pore volume is contained in pores whose diameters, comprising from 10% to 90% of the pore diameter distribution, d10 through d90, lie within the range of 50% around the average pore diameter.

2. The iodine adsorption agent of claim 1, wherein 80% of the pore volume is contained in pores whose pore diameter diameters, d10 through d90, lie within the range of 40% around the average pore diameter.

3. The iodine adsorption agent of claim 1, wherein the agent has a pore volume greater than approximately 0.15 $cm^3/g$.

4. The iodine adsorption agent of claim 1, wherein the agent has a specific surface area of approximately 30 to 150 $m^2/g$.

5. The iodine adsorption agent of claim 1, wherein the agent contains approximately 2 to 40% by weight Ag., based on elemental silver.

6. The iodine adsorption agent of claim 1, wherein the agent contains approximately 5 to 30% by weight Ag., based on elemental silver.

7. The iodine adsorption agent of claim 1, wherein the carrier's composition is selected from the group comprising $Al_2O_3$, $SiO_2$, $TiO_2$, $ZrO_2$, amorphous aluminum silicate or mixtures thereof.

8. The iodine adsorption agent of claim 1, wherein the carrier is in the form of a molded object with the largest dimension of approximately 0.1 to 5 mm.

9. The iodine adsorption agent of claim 1, wherein the carrier is in the form of a molded object with the largest dimension of approximately 0.5 to 3 mm.

10. The iodine adsorption agent of claim 1, wherein the carrier has an average pore diameter, d50, in the range from about 6 to 100 mm.

* * * * *